US011970917B2

(12) United States Patent
McIntyre

(10) Patent No.: US 11,970,917 B2
(45) Date of Patent: Apr. 30, 2024

(54) SYSTEM AND METHOD FOR REMOVING DRILLING FLUID FROM DRILL CUTTINGS USING DIRECT HEAT

(71) Applicant: Elavo Energy Solutions Ltd., Calgary (CA)

(72) Inventor: Barry McIntyre, Calgary (CA)

(73) Assignee: ELAVO ENERGY SOLUTIONS LTD., Calgary (CA)

( * ) Notice: Subject to any disclaimer, the term of this patent is extended or adjusted under 35 U.S.C. 154(b) by 59 days.

(21) Appl. No.: 17/755,413

(22) PCT Filed: Nov. 18, 2020

(86) PCT No.: PCT/CA2020/051568
§ 371 (c)(1),
(2) Date: Apr. 28, 2022

(87) PCT Pub. No.: WO2021/097565
PCT Pub. Date: May 27, 2021

(65) Prior Publication Data
US 2022/0389777 A1    Dec. 8, 2022

Related U.S. Application Data

(60) Provisional application No. 62/939,351, filed on Nov. 22, 2019.

(51) Int. Cl.
*E21B 21/06* (2006.01)
*B01D 1/00* (2006.01)
*B01D 1/14* (2006.01)

(52) U.S. Cl.
CPC .......... *E21B 21/063* (2013.01); *B01D 1/0082* (2013.01); *B01D 1/14* (2013.01)

(58) Field of Classification Search
CPC ........ E21B 21/063; B01D 1/0082; B01D 1/14
See application file for complete search history.

(56) References Cited

U.S. PATENT DOCUMENTS

| 3,232,885 A | 2/1966 | Henke |
| 3,241,248 A | 3/1966 | Gerlach et al. |

(Continued)

FOREIGN PATENT DOCUMENTS

| CN | 109538139 A | 3/2019 |
| EP | 1153197 B1 | 4/2004 |
| WO | WO-2014/171839 A1 | 10/2014 |

OTHER PUBLICATIONS

International Search Report and Written Opinion for International Application No. PCT/CA2020/051566, dated Feb. 5, 2021, (12 pages), Canadian Intellectual Property Office, Quebec, Canada.

(Continued)

*Primary Examiner* — Crystal J. Lee
(74) *Attorney, Agent, or Firm* — Alston & Bird LLP

(57) ABSTRACT

Methods and systems for removing drilling fluid from wet drill cuttings are described. According to some embodiments, the method comprises: at a pressure above atmospheric pressure: using an internal combustion engine, combusting an air-fuel mixture comprising air and a hydrocarbon-based fuel, thereby producing a combustion exhaust at a first temperature; providing the combustion exhaust to the wet drill cuttings to contact and directly heat the wet drill cuttings by convection so that at least some fluid is evaporated therefrom and at least some dry solid drill cuttings remain, the evaporated fluid comprising drilling fluid and water; condensing at least a portion of the evaporated fluid to produce condensed drilling fluid, water and non-condensable inert gas; and separately recovering the condensed drilling fluid, the water and the dry solid drill cuttings.

19 Claims, 7 Drawing Sheets

(56) References Cited

U.S. PATENT DOCUMENTS

| | | | |
|---|---|---|---|
| 3,538,614 | A | 11/1970 | Weimer et al. |
| 4,139,462 | A | 2/1979 | Sample, Jr. |
| 4,208,285 | A | 6/1980 | Sample, Jr. |
| 4,222,988 | A | 9/1980 | Barthel |
| 4,304,609 | A | 12/1981 | Morris |
| 4,387,514 | A | 6/1983 | McCaskill, Jr. |
| 4,725,362 | A | 2/1988 | Dugat |
| 5,090,498 | A | 2/1992 | Hamill |
| 5,882,381 | A | 3/1999 | Hauck et al. |
| 6,530,438 | B1 * | 3/2003 | McIntyre .............. E21B 21/065 |
| | | | 175/207 |
| 6,695,077 | B2 * | 2/2004 | Szymocha ................ B09B 3/40 |
| | | | 134/25.1 |
| 6,722,436 | B2 | 4/2004 | Krill |
| 7,306,057 | B2 | 12/2007 | Strong et al. |
| 7,337,860 | B2 | 3/2008 | McIntyre |
| 8,074,738 | B2 | 12/2011 | McDonald et al. |
| 8,158,000 | B2 | 4/2012 | Newman et al. |
| 8,356,678 | B2 | 1/2013 | Perez-Cordova |
| 8,607,894 | B2 | 12/2013 | McDonald et al. |
| 8,641,895 | B2 | 2/2014 | Perez-Cordova |
| 8,728,281 | B2 | 5/2014 | Browne et al. |
| 8,820,438 | B2 | 9/2014 | Ross et al. |
| 9,073,104 | B2 | 7/2015 | Burnett et al. |
| 9,334,449 | B2 | 5/2016 | Perez-Cordova |
| 9,364,877 | B2 | 6/2016 | Brady |
| 9,370,809 | B2 | 6/2016 | Brady et al. |
| 9,393,603 | B2 | 7/2016 | Brady |
| 9,636,723 | B2 | 5/2017 | Brady |
| 9,732,673 | B2 | 8/2017 | Denton et al. |
| 9,884,997 | B2 | 2/2018 | Podlipskiy |
| 9,939,197 | B2 | 4/2018 | Hoffman |
| 2003/0136747 | A1 | 7/2003 | Wood |
| 2003/0155158 | A1 | 8/2003 | Szymocha et al. |
| 2005/0153844 | A1 | 7/2005 | McIntyre |
| 2005/0247599 | A1 | 11/2005 | Browne et al. |
| 2005/0260111 | A1 * | 11/2005 | Arrison ................... F26B 17/20 |
| | | | 422/198 |
| 2010/0038143 | A1 | 2/2010 | Burnett et al. |
| 2012/0073932 | A1 | 3/2012 | Burnett et al. |
| 2015/0153102 | A1 | 6/2015 | Burnett et al. |
| 2015/0300108 | A1 | 10/2015 | Ahuja et al. |
| 2015/0315454 | A1 | 11/2015 | Perez-Cordova |
| 2016/0326020 | A1 | 11/2016 | Kubala et al. |
| 2022/0381096 | A1 | 12/2022 | McIntyre |
| 2022/0389778 | A1 | 12/2022 | McIntyre |

OTHER PUBLICATIONS

International Search Report and Written Opinion for International Application No. PCT/CA2020/051567, dated Jan. 18, 2021, (11 pages), Canadian Intellectual Property Office, Quebec, Canada.
Extended European Search Report for European Patent Application No. 20889537.5, dated Feb. 15, 2023, (8 pages), European Patent Office, Munich, Germany.
Extended European Search Report for European Patent Application No. 20889703.3, dated Feb. 15, 2023, (8 pages), European Patent Office, Munich, Germany.
International Search Report and Written Opinion for International Application No. PCT/CA2020/051568, dated Feb. 3, 2021, (12 pages), Canadian Intellectual Property Office, Quebec, Canada.
Communication Pursuant to Rule 164(1) EPC for European Patent Application No. 20889702.5, dated Oct. 9, 2023, (16 pages), European Patent Office, Munich, Germany.
Communication Pursuant to Article 94 (3) EPC for European Patent Application No. 20889537.5, dated Nov. 28, 2023, (8 pages), European Patent Office, Netherlands.
Supplementary European Search Report for European Application No. 20889702.5, dated Dec. 19, 2023, (13 pages), European Patent Office, Munich, Germany.
Communication Pursuant to Article 94 (3) EPC for European Patent Application No. 20889703.3, dated Nov. 28, 2023, (7 pages), European Patent Office, Netherlands.

* cited by examiner

SYSTEM AND METHOD FOR REMOVING DRILLING FLUID FROM DRILL CUTTINGS USING DIRECT HEAT

CROSS-REFERENCE TO RELATED APPLICATIONS

The present application claims priority from U.S. Provisional Patent Application No. 62/939,351 filed on Nov. 22, 2019, the contents of which are incorporated herein by reference.

FIELD

The specification relates generally to the removal of drilling fluid from wet drill cuttings generated in the drilling of oil and gas wells, and the like, and specifically to methods and systems to remove drilling fluid from wet drill cuttings using thermal techniques.

BACKGROUND

Drilling for oil and gas produces drill cuttings which are brought to ground surface in the circulating drilling fluid. The drill cuttings may be substantially separated from the drilling fluid using various combinations of shale shakers, centrifuges and mud tanks. However, some liquid or moisture remains associated with the solid "cuttings" as a surface layer and, in some cases, internally thereof. In cases where the drilling fluid is hydrocarbon-based, the cuttings usually are associated with oil, water and drilling fluid chemical additives.

Disposal of the wet cuttings is often problematic, as the associated liquids are of environmental concern. These liquids also present problems in handling and treatment. There is a well-known propensity of these cuttings to cake or form unwanted agglomerations when heated and due to mechanical handling and transport operations. This tendency is affected by the amount of liquid present and the nature of the solids and liquids, which can be quite variable.

Current methods for disposing of cuttings contaminated with drilling fluid include: hauling the cuttings to a land fill and burying them; composting; bio-remediation; thermal desorption; and combustion. The current methods focus on how to clean up the mess once drilling is terminated, rather than on how to prevent its occurrence in the first place. With most currently used methods, little, if any, of the liquids are recovered, resulting in a loss of drilling fluid. The lost fluid results in increased costs to the drilling operator, including increased disposal costs.

Thermal desorption processes are appealing for use in cleaning up cuttings associated with hydrocarbon-based drilling fluids because they can theoretically achieve a zero-residual hydrocarbon level. The thermal desorption processes currently used focus on removal of the liquids after drilling is terminated, and usually involve indirect heat. It is commonly believed that using indirect heat to dry the cuttings will reduce the risk of an uncontrolled exothermic reaction between the heated air and the drilling fluids, and that direct heating would require using a heating gas supply that does not support combustion (i.e., a non-combustible heating gas supply). As a result, in processes that use direct heat, friction, rather than heated air, are typically used to generate heat for drying the cuttings (e.g., via hammermill). In addition, current processes that use direct heat are not intended to recover drilling fluid since they usually involve direct heat in conjunction with combustion of the produced drilling fluid vapour.

BRIEF DESCRIPTIONS OF THE DRAWINGS

For a better understanding of the various embodiments described herein and to show more clearly how they may be carried into effect, reference will now be made, by way of example only, to the accompanying drawings in which.

DETAILED DESCRIPTION

Figure 1A:
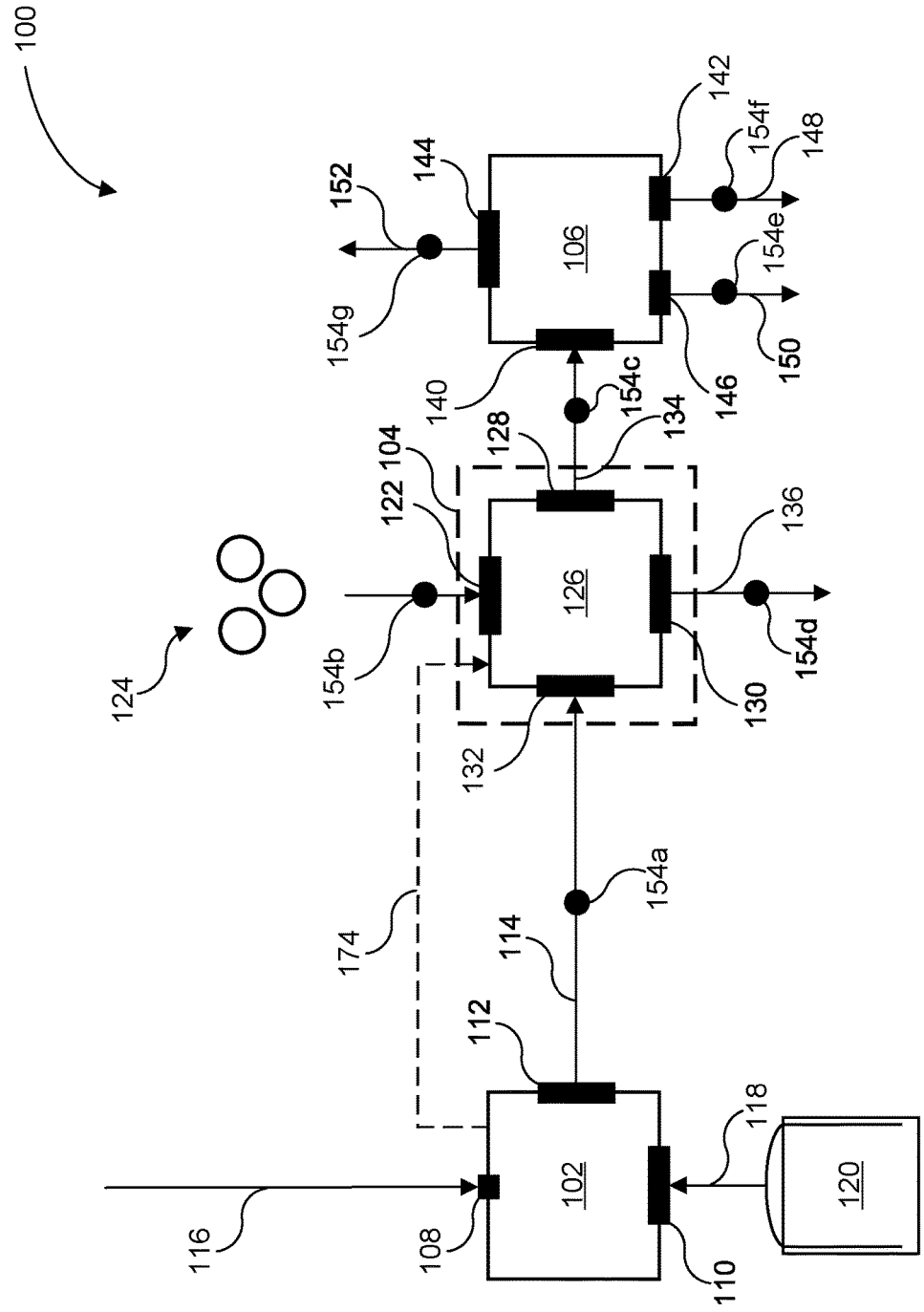
FIG. 1A depicts a system for removing drilling fluid from wet drill cuttings, according to a first set of non-limiting embodiments.

Herein described are systems and methods for removing drilling fluid from wet drill cuttings. The systems and methods provide practical and efficient means for the drying of drill cuttings generated in the drilling of oil and gas. The wet drill cuttings are directly heated using a low oxygen, generally inert gas at a temperature such that at least some fluid is evaporated therefrom and at least some solid, dry drill cuttings remain. The evaporated fluid comprises drilling fluid and water. The low oxygen, generally inert gas comprises the products of combustion of an air-fuel mixture comprising air and a hydrocarbon-based fuel, specifically combustion exhaust from an internal-combustion engine. At least a portion of the evaporated fluid is condensed to produce condensed drilling fluid, water and non-condensable inert gas. At least the condensed drilling fluid, water and dry solid drill cuttings are separately recovered.

Utilizing a low oxygen, generally inert gas helps reduce the potential for unwanted reactions, including uncontrolled, exothermic reactions. This gas is provided to the wet drilling cuttings so as to contact and directly heat them and is also referred to herein as the "process gas" (which may comprise a mixture of gases). The low oxygen content of the process gas usually allows the process gas to be provided to the wet drill cuttings at higher temperatures with a lower explosion risk of the drilling fluid than many known systems, particularly known systems that utilize a lean drying gas. The hotter combustion process usually requires less excess oxygen and does not usually increase the carbon monoxide content of the heating gas. For example, according to some embodiments, the combustion exhaust is further heated prior to being provided to the wet drill cuttings. In addition, the described methods are performed at a pressure above atmospheric pressure, rather than in a vacuum, to help prevent air from entering the system (which may introduce excess oxygen). According to some embodiments, the drying of the drill cuttings is continuous. According to some embodiments, the drying of the drill cuttings is performed as a batch process.

According to some embodiments, the water and/or the non-condensable inert gas are recycled and re-purposed. For example, according to some embodiments, the non-condensable inert gas is heated and provided to the wet drill cuttings as at least a portion of the "process gas" (to contact and directly heat the wet drill cuttings by convection separately or in combination with the combustion exhaust).

According to some embodiments, the process gas is at least partially the products of a rich burn process (combustion of a rich fuel-air mixture). According to some embodiments, the rich burn process is capable of producing combustion exhaust comprising less than or equal to about 0.02% oxygen.

In terms of process efficiency, it has been found that lower oxygen levels usually result in less inert gas being heated as there will be less excess nitrogen. Generally, lower excess oxygen levels tend to result in less heat being absorbed by the heating of extra inert nitrogen which, in turn, tends to result in a higher combustion exhaust temperature. This helps achieve a higher process gas temperature, which can improve heat transfer and help minimize the overall process gas flow, subsequently reducing solids entrainment and carryover.

The described systems and methods also provide for the recovery of drilling fluids, water and dried solid drill cuttings. For example, at least a portion of the evaporated fluid may be condensed such that condensed drilling fluid and water can be separately recovered from dried solid drill cuttings. According to some embodiments, the described systems and methods also provide for the recovery of at least some non-condensable inert gas from the condensed evaporated fluid.

As described further below, the described systems and methods may further comprise additional means to measure, maintain and/or fine tune the oxygen, pressure and/or carbon monoxide levels of the gas flow at various stages of the processes.

For the purposes of this application, "wet drill cuttings" include rock and biomass particles, and drilling fluid retrieved from a well drilling operation. The exact composition of the wet drill cuttings will vary from one operation to another and during an operation due to changing rock/biomass composition and drilling fluid composition. However, the wet drill cuttings can comprise, without limitation, hydrocarbons, water, shales, clays, sandstone, carbonates, drilling fluids and combinations thereof. For example, according to some embodiments, the wet drill cuttings may comprise about 80% solids by weight and about 20% fluids by weight. According to some embodiments, the fluid fraction is about 90% hydrocarbon-based fuel or oil and about 10% water.

The terms "rich" and "lean" are also used herein. For clarity, "rich" and "lean" are used herein to denote the level of oxygen in an air-fuel mixture. A "rich air-fuel mixture" or "rich exhaust" is an air-fuel mixture having lower oxygen levels below stoichiometric. In contrast, a "lean air-fuel mixture" or "lean exhaust" is an air-fuel mixture having an excess of oxygen (oxygen level above stoichiometric). As would then be understood, "rich combustion" denotes combustion of a rich air-fuel mixture and "lean combustion" denotes combustion of a lean air-fuel mixture.

It will be appreciated that for simplicity and clarity of illustration, where considered appropriate, reference numerals may be repeated among the figures to indicate corresponding or analogous elements. In addition, numerous specific details are set forth in order to provide a thorough understanding of the exemplary aspects of the present application described herein. However, it will be understood by those of ordinary skill in the art that the exemplary aspects described herein may be practiced without these specific details. In other instances, well-known methods, procedures and components have not been described in detail so as not to obscure the exemplary aspects described herein. Also, the description is not to be considered as limiting the scope of the exemplary aspects described herein. Any systems, method steps, method blocks, components, parts of components, and the like described herein in the singular are to be interpreted as also including a description of such systems, method steps or tasks, components, parts of components, and the like in the plural, and vice versa.

Attention is directed to FIG. 1A, which depicts an example system 100 for removing drilling fluid from wet drill cuttings, according to non-limiting embodiments. System 100 operates at a pressure above atmospheric pressure, which helps prevent air from the surrounding environment from entering the system (air which will usually contain excess oxygen). System 100 comprises an internal combustion engine 102, a processor 104 having a processing chamber 126 and at least one condensing device 106.

Internal combustion engine 102 comprises at least one air inlet 108, at least one fuel inlet 110 and at least one exhaust outlet 112 and is configured to combust an air-fuel mixture comprising air and a hydrocarbon-based fuel, thereby producing a combustion exhaust 114 at a first temperature, $T_1$. According to some embodiments, internal combustion engine 102 is a spark ignition engine, such as a natural gas engine; however, any suitable internal combustion engine is contemplated. Air 116 is provided, directly or indirectly, to internal combustion engine 102 via air inlet(s) 108 and hydrocarbon-based fuel 118 is provided to internal combustion engine 102, directly or indirectly, via fuel inlet(s) 110. Hydrocarbon-based fuel 118 is provided from any suitable fuel source or combination of fuel sources, such as natural gas fuel source 120 and/or flue gas. Air 116 may be supplied in any suitable manner, such as by a centrifugal or positive displacement blower (not shown).

Processor 104 comprises at least one cuttings inlet 122, through which wet drill cuttings 124 are received into processor chamber 126, at least one evaporated fluids outlet 128, at least one dry drilling solids outlet 130 and at least one exhaust inlet 132 configured to receive combustion exhaust 114, directly or indirectly, from exhaust outlet(s) 112. In particular, exhaust inlet(s) 132 is in fluid communication with exhaust outlet(s) 112. Processor 104 is configured to provide combustion exhaust 114 to processing chamber 126 to contact and directly heat the received wet drill cuttings 124 by convection so that at least some fluid is evaporated therefrom (such as evaporated fluid 134) and at least some dry solid drill cuttings remain (such as dried solid drill cuttings 136).

Processor 104 may be any mechanical device or combination of mechanical devices configured to distribute hot gases into drill cuttings received by the processing chamber 126. The components of the processor 104, including those of the processing chamber 126, are selected to operate reliably at temperatures sufficient to vaporize fluids contaminating the wet drill cuttings 124. According to some embodiments, selection of the components of the processor 104 takes into consideration an additional safety margin to give a maximum failure temperature above a pre-determined operating temperature, as discussed further below. According to some embodiments, the processor 104 is configured to agitate or mechanically mix the wet drill cuttings 124 received into the processing chamber 106 while the combustion exhaust 114 as the process gas(es) is being provided thereto. The agitation or mechanical mixing helps facilitate the heating and drying of the wet cuttings by conduction, and to transfer heat from drier drill cuttings to less dry drill cuttings.

Any suitable device or combination of devices or components to agitate or mechanically mix the drill cuttings is contemplated.

Figure 1B:
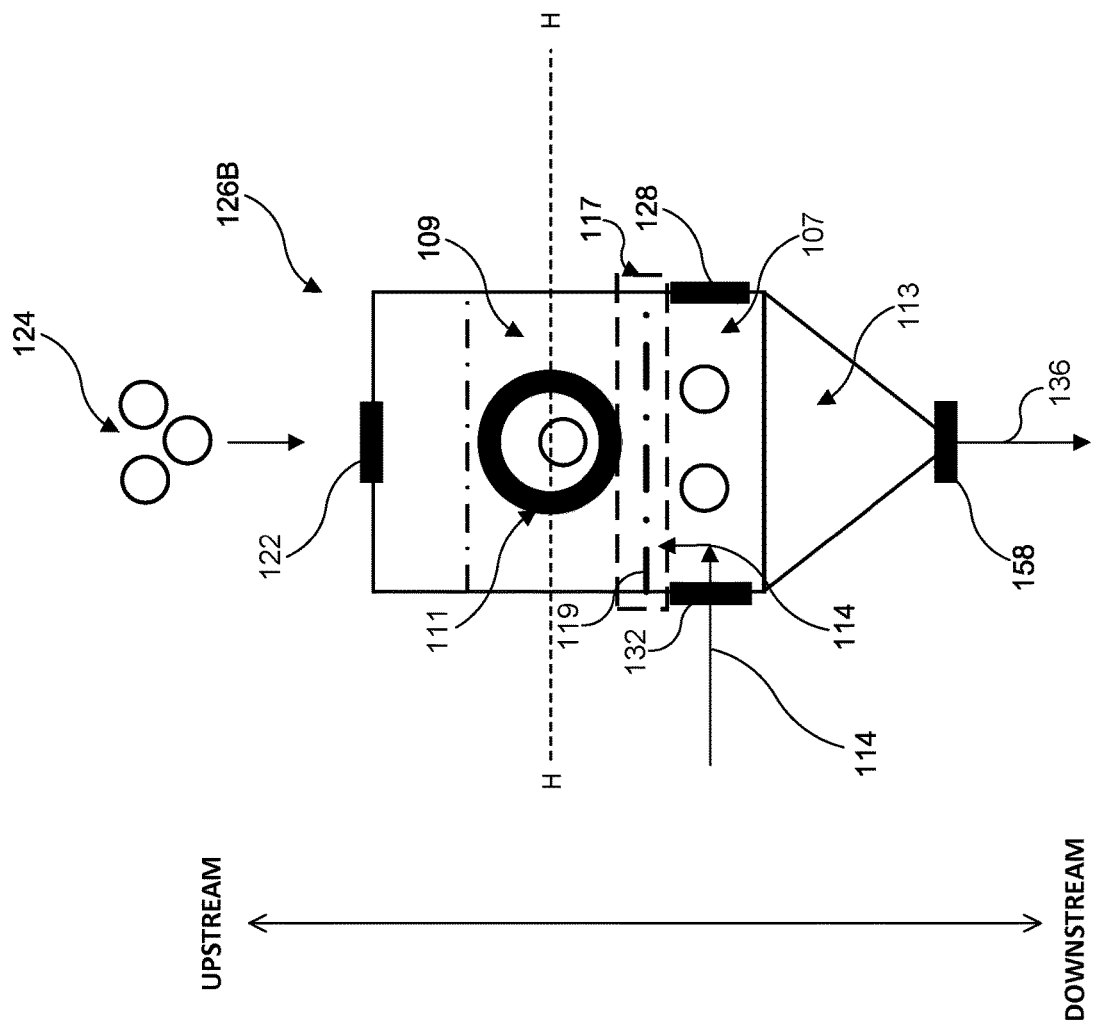
FIG. 1B depicts a processing chamber of a system for removing drilling fluid from wet drill cuttings, according to non-limiting embodiments.

Attention is directed to FIG. 1B, which depicts example processing chamber 126B according to non-limiting embodiments and in which like or similar elements are denoted by like or similar numbers in FIG. 1A. For simplicity and ease of understanding, discussion of the systems and devices depicted in FIG. 1B will focus on certain similarities and differences from those depicted in FIG. 1A. Processing chamber 126B comprises fixed stage 107 and agitator stage 109. Fixed stage 107 is in fluid communication with exhaust inlet(s) 132 and configured to receive combustion exhaust 114. Fixed stage 107 comprises fixed bed 119, which comprises at least one fluidly permeable interface operatively connected to exhaust inlet(s) 132. Agitator stage 109 is in fluid communication with fixed bed 119 and configured to receive combustion exhaust 114 therefrom. As shown in FIG. 1B, agitator stage 109 may be upstream fixed stage 107. Agitator stage 107 is also operatively connected to cuttings inlet(s) 122 to receive wet drill cuttings 124 therefrom. In addition, agitator stage 107 comprises at least one mixing device, such as mixing device 111, configured to agitate wet drill cuttings 124 received via cuttings inlet(s) 122. According to some embodiments, mixing device 111 is a mechanical mixing device.

According to some embodiments, processing chamber 126B further comprises a purging device 113 downstream fixed stage 107 and configured to compel at least a portion of the dry solid drill cuttings 136 for receipt by the dry solids outlet 158. According to some embodiments, purging device 113 comprises a screw conveyor configured to remove at least a portion of the processed cuttings from the bottom of fixed stage 107.

According to some embodiments, fixed stage 107 comprises a heat distribution system 117 configured to distribute the received combustion exhaust 114 across at least one heat distribution plane of agitator stage 109, such as heat distribution plane H-H (which may be parallel to an axial plane of mixing device 111).

In operation, combustion exhaust 114 received from exhaust inlet(s) 132 is distributed into fixed bed 119. According to some embodiments, the combustion exhaust 114 is distributed across a plane parallel to the axial plane of mixing device 111, for example, (which may be a mechanical tumbling device), and downstream the area agitated by mixing device 111, forming a fixed, heated bed downstream the agitator stage 109.

Introducing combustion exhaust 114 to wet drill cuttings 124 in stages (a fixed stage and an agitator stage) may provide for uniform distribution of the combustion exhaust 114 to wet drill cuttings 124, which may provide for more uniform and efficient heat transfer while also providing more of the combustion exhaust 114 to the interior of the processing chamber 126B than externally (for better thermal efficiency). In addition, combining a fixed stage and an agitator stage may also provide for increased residence time for agglomerates to dry. As the agglomerates dry, fine particles that are released usually tend to migrate up to the agitator stage while heavier particles may remain. A purging device may be used to assist in the downstream migration of the heavier particles and agglomerates into the fixed stage.

According to some embodiments, internal combustion engine 102 provides motive force and/or electricity to the processor 104 and/or other devices in system 100. For example, internal combustion engine 102 may provide at least some shaft power 174 to the processor 104 (FIG. 1A).

Processor 104 is further configured to provide evaporated fluid(s) 134 to the evaporated fluids outlet(s) 128 and to provide the dry solid drill cuttings 136 to dry drilling solids outlet(s) 130 for recovery therefrom. It is noted that the evaporated fluid(s) 134 comprises at least some drilling fluid and water.

Condensing device(s) 106 comprises at least one condenser inlet 140 in fluid communication with the evaporated fluids outlet(s) 128, at least one condensed drilling fluids outlet(s) 142, at least one non-condensable inert gas outlet(s) 144 and at least one water outlet(s) 146. Condensing device(s) 106 is configured to condense at least a portion of the evaporated fluid 134, received directly or indirectly from the evaporated fluids outlet 128, to produce condensed drilling fluid 148, water 150 and non-condensable inert gas 152. Condensing device(s) 106 is further configured to: provide the condensed drilling fluid 148 to the condensed drilling fluids outlet(s) 142 for recovery therefrom; provide the non-condensable inert gas 152 to the non-condensable inert gas outlet(s) 144 for recovery therefrom; and to provide the water 150 to the water outlet(s) 146 for recovery therefrom. Any suitable device or combination of devices for condensing at least a portion of the evaporated fluid 134 are contemplated. For example, according to some embodiments, condensing device(s) 106 comprises one or more heat exchanger(s) and/or direct contact condenser(s). As another example, according to some embodiments, condensing device(s) 106 comprises at least one direct contact condenser coupled with a liquid-air exchanger (radiator).

The systems and methods described herein may comprise additional devices and/or subsystems to help monitor and/or modify characteristics of the fluid flow in the fluid circuit of the system, such as the oxygen level, fluid pressure, fluid flow direction and/or flow rate, to help improve thermal efficiency, safety, reduce waste products, and/or conserve fuel. For example, according to some embodiments, system 100 comprises one or more flow control devices and/or pressure devices, such as devices 154a, 154b, 154c, 154d, 154e, 154f and 154g (collectively referred to herein as devices 154), in fluid communication with one or more of the exhaust outlet(s) 112, the cuttings inlet(s) 122, the dry drilling solids outlet(s) 130, the condenser inlet(s) 140, the condensed drilling fluids outlet(s) 142, the non-condensable inert gas outlet(s) 144 and the water outlet(s) 146. According to some embodiments, the flow control devices and/or pressure devices comprise at least one backflow prevention device.

As discussed above, a feature of the described systems and methods is the use of a very hot process gas stream to directly heat and dry the wet drill cuttings. The oxygen level is in a range low enough to allow the process gas to reach an elevated temperature sufficient for thermal desorption of at least some of the drilling fluids and to achieve a lower risk of explosion than process gas having excess oxygen (lean air-fuel mixture). For example, U.S. Pat. No. 6,695,077 (Szymocha et al.), which is incorporated herein by reference, recommends maintaining an oxygen level below 8% on a mole fraction basis to prevent explosion of the drilling fluid vapor. According to some embodiments, the oxygen level in the process gas stream is about 8% or less. According to some embodiments, the oxygen level in the process gas stream is about 1%. According to some embodiments, the oxygen level in the process gas stream is in the range of about 1% to about 2% or in the range of about 1% to about 8%. The hot combustion exhaust in conjunction with the expected, slightly elevated combustion pressures will help force the process gas through the drill cutting solids, after which the pressure in the vapor space will only be slightly above atmospheric. The low oxygen level of the process gas stream provides for minimum excess gas to heat, higher process gas temperatures and, in combination with the high degree of nitrogen dilution, minimizes potential for any unwanted chemical reactions.

According to some embodiments, the temperature of the hot process gas stream is in a range of about 300° C. to about 500° C., or a range of about 300° C. to about 400° C., or a range of about 400° C. to about 500° C. According to some embodiments, the temperature of the hot process gas stream is about 500° C. It is understood that the inlet temperature of the processing chamber combustion exhaust inlet 132, and associated ducts/nozzles, may be higher, and material selection may take these higher temperatures into account. For example, the temperature profile of the processor 104, including the processing chamber 126, after the process gas enters the processing chamber 126 is such that the process gas gives up its heat typically within a few inches to asymptotically approach the process gas temperatures described above.

Figure 2:
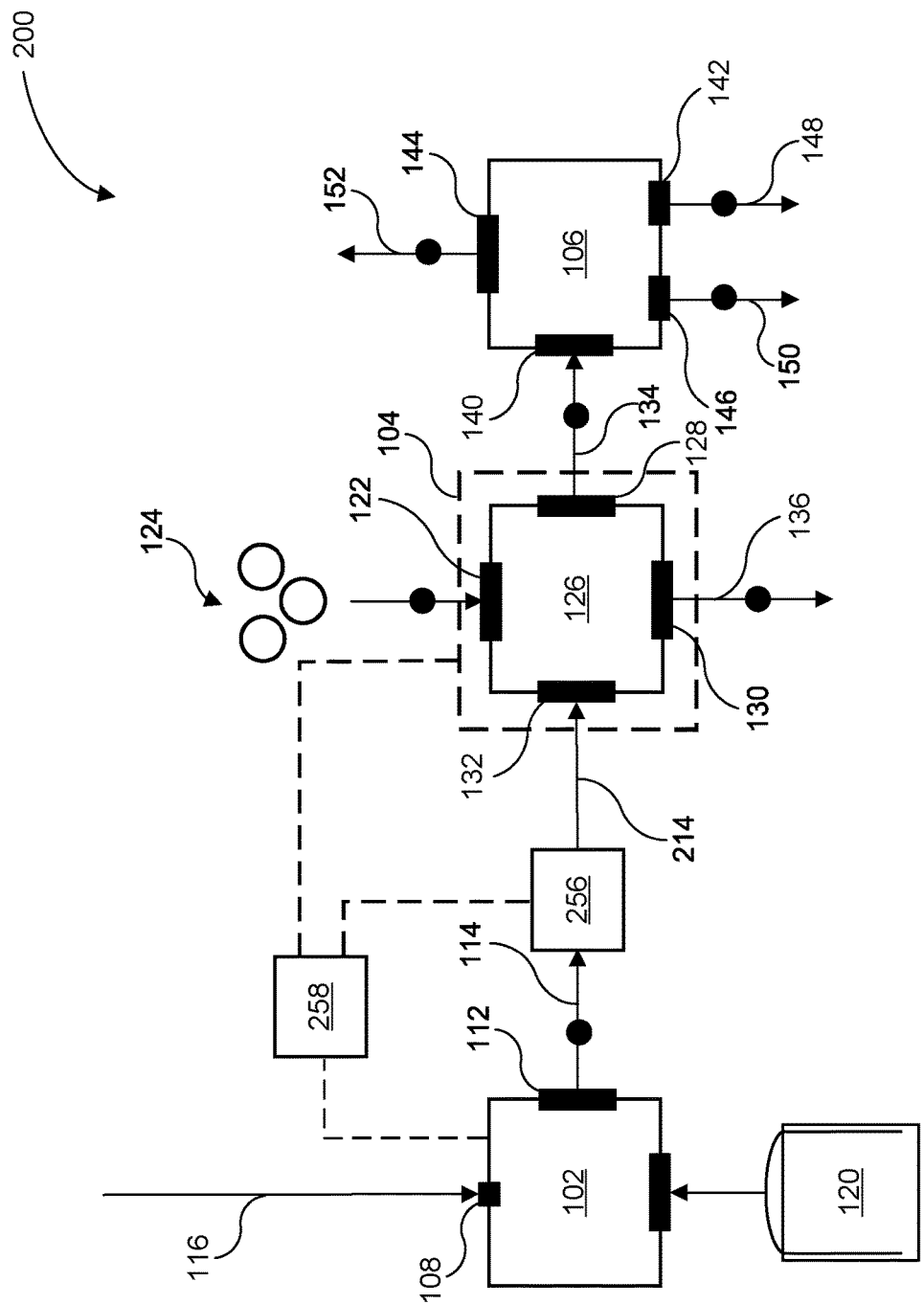
FIG. 2 depicts a system for removing drilling fluid from wet drill cuttings, according to a second set of non-limiting embodiments.

Attention is directed to FIG. 2, which depicts example system 200 for removing drill fluid from wet drill cuttings, according to non-limiting embodiments, and in which like or similar elements are denoted by like or similar numbers in FIGS. 1A and 1B. For simplicity and ease of understanding, discussion of the systems and devices depicted in FIG. 2 will focus on certain similarities and differences from those depicted in FIGS. 1A and 1B. Similar to example system 100, example system 200 operates at a pressure above atmospheric pressure.

System 200 further comprises heating device 256 configured to receive and heat combustion exhaust 114 to a second temperature, $T_2$, higher than $T_1$ prior to receipt by the processor 104 (e.g., as heated combustion exhaust 214 provided to combustion exhaust inlet 132). Any suitable heating device or combination of devices are contemplated. For example, according to some embodiments, heating device 256 comprises at least one electric line heater.

According to some embodiments, example system 200 comprises one or more devices to provide motive force and/or electricity to other devices. For example, according to some embodiments, example system 200 comprises at least one generator, such as generator 258, operatively connected to internal combustion engine 102 and configured to generate electricity therewith. According to some embodiments, generator 258 is operatively connected to heating device 256 and configured to provide at least a portion of the electricity generated by the generator 258 (and vice versa heating device 256 is configured to receive at least a portion of the electricity generated by the generator 258). According to some embodiments, generator 258 is operatively connected to processor 104 and is configured to provide at least a portion of the generated electricity to the processor 104 (and vice versa processor 104 is configured to receive at least a portion of the electricity generated by the generator 258). According to some embodiments, generator 258 is operatively connected to processor 104 and/or heating device 256 and to provide at least some shaft power and/or electricity to processor 104 and/or heating device 256. As depicted in FIG. 2, according to some embodiments, generator 258 is operatively connected to both the processor 104 and the heating device 256 and configured to provide at least some shaft power and/or at least a portion of the generated electricity to the processor 104 and the heating device 256.

According to some embodiments, the systems and methods described herein comprise features to provide indirect heat to the wet drill cuttings, in addition to the direct heat described above. For example, according to some embodiments, there is provided at least one heating device, such as a supplemental heating device, that is configured to provide heat to a thermally conductive component or surface of the processor 104 (such as a jacket of the processor). According to some embodiments, the supplementary heating device is operatively connected to a generator, such as generator 258, and is configured to receive electricity generated by the generator.

According to some embodiments, the described systems and methods comprise additional features to recycle and fine tune the inputs and/or outputs. As a discussed above, the generally inert process gas provided to the wet drill cuttings comprises combustion exhaust from an internal combustion engine. However, according to some embodiments, the generally inert process gas also comprises gas(es) recycled from outputs of other devices.

Figure 3A:
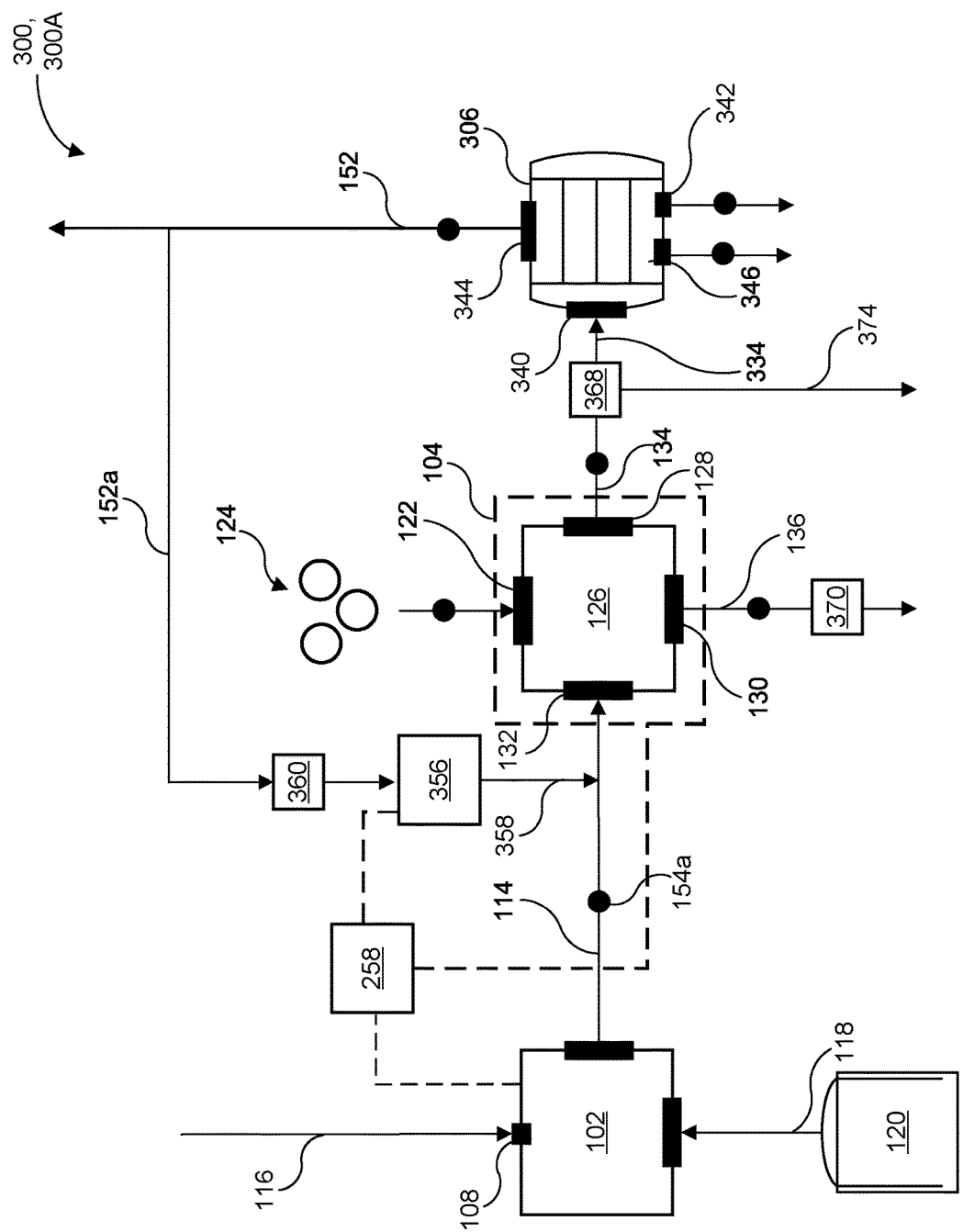
FIGS. 3A and 3B depict a system for removing drilling fluid from wet drill cuttings, according to a third and fourth set of non-limiting embodiments.
Figure 3B:
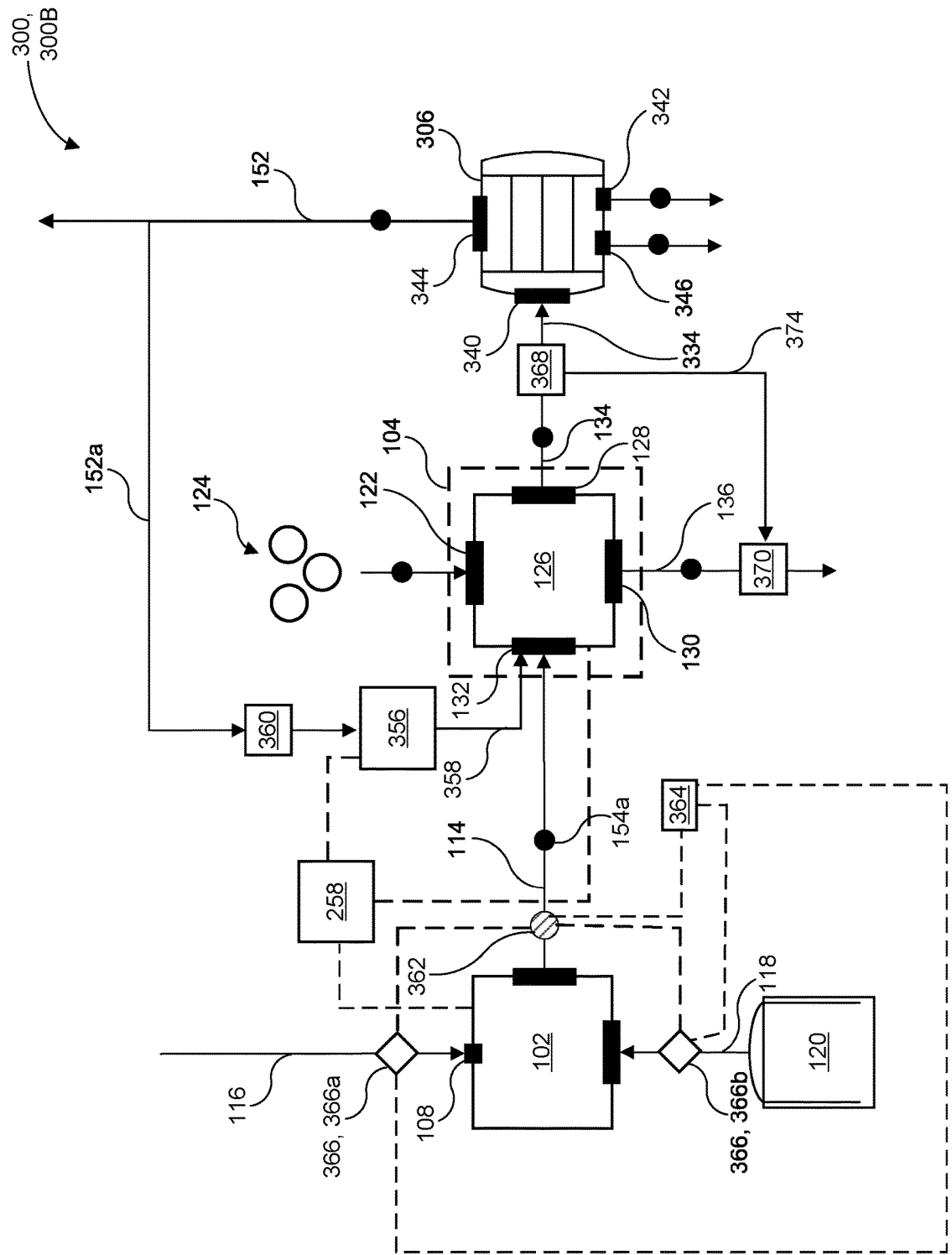

Attention is directed to FIGS. 3A and 3B, which depict example systems 300A and 300B (collectively referred to as system(s) 300) for removing drilling fluid from wet drill cuttings, according to non-limiting embodiments, and in which like or similar elements are denoted by like or similar numbers in FIGS. 1A, 1B and 2. For simplicity and ease of understanding, discussion of the systems and devices depicted in FIGS. 3A and 3B will focus on certain similarities and differences from those depicted in FIGS. 1A, 1B and 2. In particular, in example systems 300 at least a portion of the recovered non-condensable inert gas 152, such as portion 152a, is recycled as a constituent of the process gas provided to the processor 104.

As depicted in FIG. 3A, the condensing device may comprise at least one heat exchanger, such as heat exchanger 306 having condenser inlet 340, condensed drill fluids outlet 342, non-condensable inert gas outlet 344 and water outlet 346; however, it is understood that the condensing device comprises any suitable device or combination of devices. According to some embodiments, portion 152a of the non-condensable inert gas is combined with the combustion exhaust 114 prior to receipt by the processor 104, via combustion exhaust inlet 132. According to some embodiments, portion 152a is heated to a third temperature, $T_3$, that is greater than or equal to $T_1$. For example, according to some embodiments, at least one heating device, such as heating device 356, is configured to receive, directly or indirectly from heat exchanger 306, at least a portion recovered non-condensable inert gas 152 and heat the received non-condensable inert gas, such as portion 152a, to $T_3$. The heating device is further configured to provide the heated, recovered non-condensable inert gas (shown as heated non-condensable inert gas 358) to processor 104 to contact and directly heat the wet drill cuttings 124 by convection, separately or in combination with the combustion exhaust 114. For example, as depicted in FIG. 3A, the heated non-condensable inert gas 358 is combined with the fluid stream comprising combustion exhaust 114 prior to receipt by the processor 104 (after device 154a, if present, which may comprise a backflow prevention device). However, as depicted in FIG. 3B, according to some embodiments, heating device 356 is configured to provide the heated non-condensable inert gas 358 to the processor 104 separately from the combustion exhaust 114 (e.g., via a separate fluid stream and/or fluid path). Heating device 356 comprises any suitable device or combination of devices, such as at least one electric line heater.

As noted above, the described systems and methods may comprise additional features and devices to help monitor and/or modify characteristics of the fluid flow. According to some embodiments, systems 300 comprise at least one blower device to modulate the pressure of the received fluid. For example, according to some embodiments, systems 300 comprises recycle blower 360 configured to receive at least a portion of non-condensable inert gas 152, such as portion 152a, and to provide portion 152a to heating device 356 at a greater pressure than that of the portion 152a as received by the recycle blower 360. Any suitable blower device or combination of blower devices are contemplated, such as one or more centrifugal blowers and positive displacement blowers.

According to some embodiments, the described systems and methods comprise one or more oxygen sensing device(s) and/or carbon monoxide sensing device(s) configured to sense at least one of an oxygen level and a carbon monoxide level of the combustion exhaust 114 and/or at other points in the fluid circuit. For example, according to some embodiments, example system 300B comprises sensing device(s) 362 configured to sense at least one of an oxygen level and a carbon monoxide level of the combustion exhaust 114. According to some embodiments, the oxygen level and carbon monoxide level sensing activities of sensing devices 362 are performed by the same sensing device (e.g., sensing device 362 senses both an oxygen level and a carbon monoxide level). However, according to some embodiments, the oxygen level and carbon monoxide level sensing activities are performed by separate sensing devices. Any suitable sensing device or combination of sensing devices are contemplated.

According to some embodiments, the described systems and methods further comprise at least one controller operatively connected to at least one oxygen sensing device and/or at least one carbon monoxide device and further operatively connected to at least one air inlet(s) and/or at least one fuel inlet(s) of the internal combustion engine. The controller(s) operate similarly to the speed control on a car, where the throttle supplies fuel to the engine and the control system fine tunes oxygen and other sensors, and when the load gets to a certain level, the transmission shifts down one or more gears. For example, as depicted in FIG. 3B, controller 364 is operatively connected to valves 366a and 366b (collectively valves 366) which control the flow of fuel 118 and air 116 from the respective sources (such as fuel source 120). Controller 364 is configured to adjust the amount of fuel 118 and/or air 116 in the air-fuel mixture that is provided to the internal combustion engine 102 based on at least one of a sensed oxygen level and a sensed carbon monoxide level of the combustion exhaust. According to some embodiments, controller 364 is configured to adjust the feed rate of fuel 118 and/or flow rate of air 116 provided to the internal combustion engine 102 to maintain a desired oxygen level or range of oxygen. Controller 364 comprises any suitable device or combination of devices, including computing devices. For example, according to some embodiments, controller 364 performs fuel feed rate control (the rate fuel is fed to the internal combustion engine 102). Controller 364 may comprise a programmable logic controller (PLC) that receives inputs from sensing device(s) 362 and is configured to execute computer-executable instructions to fine tune fuel feed rate and/or air flow rate. According to some embodiments, controller 362 is operatively connected to temperature sensor(s) at a suitable point or points in the fluid flow and the controller 362 is further configured to adjust fuel feed rate and/or air flow rate into the internal combustion engine 102 to help maintain desired process gas parameters. The temperature measured at the dry solids exit, such as dry solids exit 130, may be a suitable proxy for the degree of dryness in the solids based on drilling fluid distillation curves.

System 300 also comprises a solids cooling device 370 configured to receive the dry solid drill cuttings 136 directly or indirectly from the dry solids outlet 130. Solids cooling device 370 comprises at least one dry solids inlet (not shown) for receiving the dry solid drill cuttings 136 and at least one cooled dry solids outlet (not shown) for recovery therefrom, directly or indirectly.

According to some embodiments, the systems and methods described herein comprise components to facilitate the recovery of solid and/or fluids, and to reduce waste constituents. For example, according to some embodiments, there is provided at least one filter in fluid communication with the processor and the condensing device(s) which is configured to receive the evaporated fluid from the processor (directly or indirectly from the evaporated fluids outlet of the processor), separate entrained solid drill cuttings therefrom and to provide the filtered evaporated fluid to the condensing device(s) via the condenser inlet(s). For example, as shown in FIGS. 3A and 3B, example systems 300 comprises filter 368 in fluid communication in with processor 104 and heat exchanger 306. Filter 368 is configured to separate entrained solid drill cuttings 374 from evaporated fluid 134 received from the processor 104 and to provide the filtered evaporated fluid 334 to heat exchanger 306 (or other suitable condensing device(s)). According to some embodiments, filter 368 is configured to provide the separated entrained solid drill cuttings 374 for recovery separately or combined with dry solid drill cuttings 136. For example, according to some embodiments, the separated entrained solid drill cuttings 374 are provided to the solids cooling device 370 for cooling along with dry solid drill cuttings 136 and recovery therefrom (see, for example, FIG. 3B).

Figure 4:
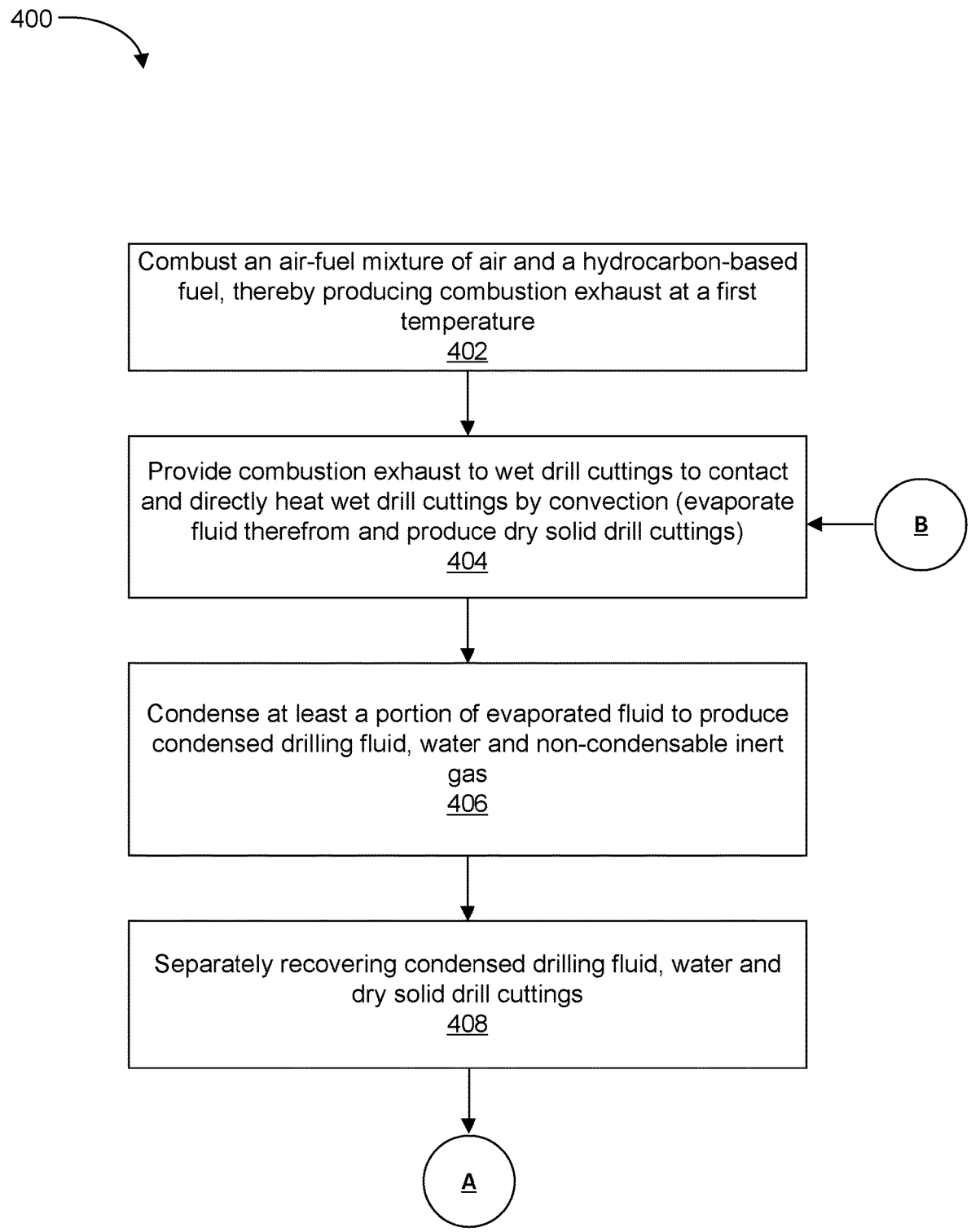
FIGS. 4 and 5 depict a method for removing drilling fluid from wet drill cuttings, according to non-limiting embodiments.
Figure 5:
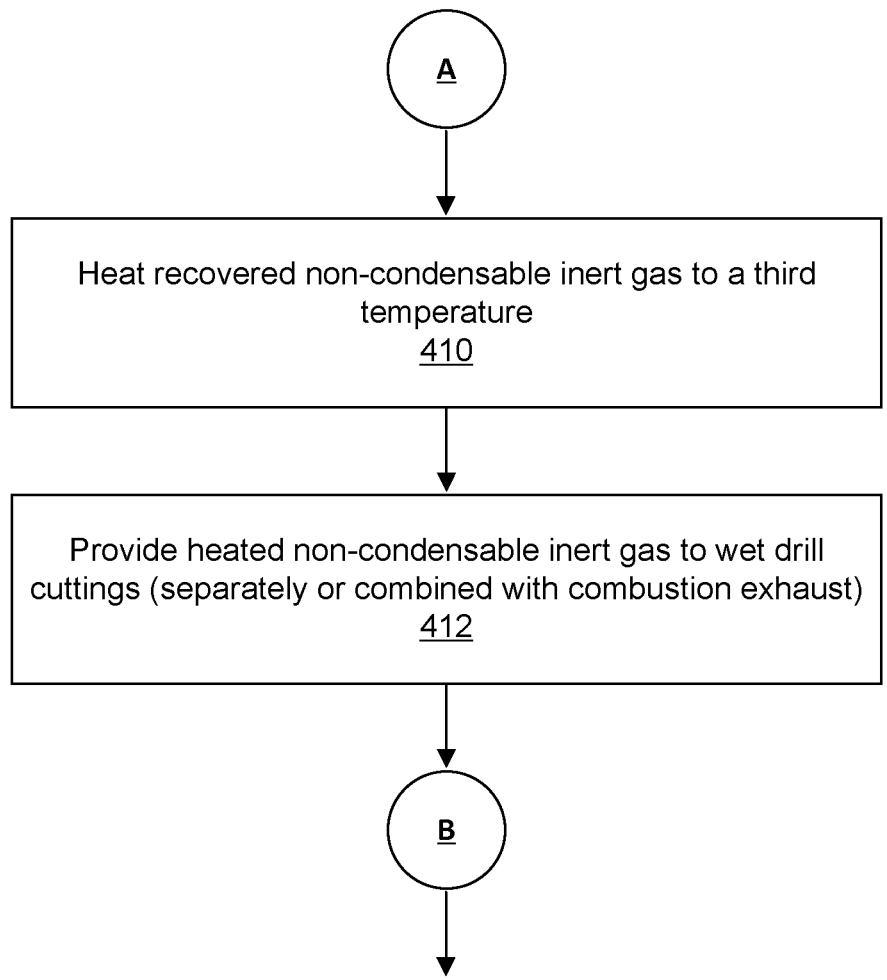

Attention is now directed to FIGS. 4 and 5, which depict a flowchart of a method 400 for removing drilling fluid from wet drill cuttings. In order to assist with the explanation of method 400, it will be assumed that method 400 is performed using example systems 100 to 300, as indicated. Furthermore, the following discussion of method 400 will lead to a further understanding of systems 100 to 300, and the various components of those systems. However, it is to be understood that systems 100 to 300 and/or method 400 can be varied and need not work exactly as discussed herein in conjunction with each other, and that such variations are within the scope of the present embodiments. It is to be emphasized, however, that method 400 need not be performed in the exact sequence as shown, unless otherwise indicated; and likewise various blocks may be performed in parallel rather than in sequence. Hence, the elements of method 400 are referred to herein as "blocks" rather than "steps". It is also to be understood, however, that method 400 can be implemented on variations of systems 100 to 300 as well.

As discussed above, the described methods, including method 400, are performed at a pressure above atmospheric pressure. At block 402, using an internal combustion engine, an air-fuel mixture (comprising air and a hydrocarbon-based fuel) is combusted, thereby producing a combustion exhaust, such as combustion exhaust 114, at a first temperature, $T_1$. At block 404, combustion exhaust 114 is provided to the wet drill cuttings, such as wet drill cuttings 124, so as to contact and directly heat the wet drill cuttings by convection so that at least some fluid is evaporated therefrom, such as evaporated fluid 134, and at least some dry solid drill cuttings remain, such as dry solid drill cuttings 136. As discussed above, the evaporated fluid comprises drilling fluid and water. As discussed above, according to some embodiments, the combustion exhaust 114 is heated to a second temperature, $T_2$, higher than $T_1$ prior to being provided to the wet drill cuttings (see, for example, system 200).

At block 406, at least a portion of the evaporated fluid is condensed to produce condensed drilling fluid, water and non-condensable inert gas (such as condensed drilling fluid 148, water 150 and non-condensable inert gas 152). For example, according to some embodiments, the evaporated fluid is condensed using a heat exchanger, such as heat exchanger 306, and/or a direct contact condenser. According to some embodiments, the heat exchanger is a liquid-air exchanger (radiator). At block 408, condensed drilling fluid, water and dry solid drill cuttings are separately recovered.

As shown in FIG. 5, according to some embodiments, the recovered non-condensable inert gas is heated to a third temperature, $T_3$, greater than or equal to $T_1$ (block 410) and the heated non-condensable inert gas is provided to the wet drill cuttings so as to contact and directly heat the wet drill cuttings by convection, separately or in combination with the combustion exhaust (see, for example, FIGS. 3A and 3B) (block 412).

Persons skilled in the art will appreciate that, for simplicity, some components that may facilitate safe, reliable operation of the system have been omitted. Such components include, but are not limited to, various sensors, valves, pumps, blowers, material handling equipment, pressure controls, backflow preventer devices and air locks. Additional means of improving thermal and energy efficiency may be incorporated in the described methods and systems. For example, additional heat recovery equipment may be included to minimize net heat loss. Such equipment may be sized to provide the desired heat input for expected or desired flow rates and liquid content, according to known teachings. The equipment may also be sized such that it has extra capacity and ability to modulate the described operations with varying input parameters.

A collection of exemplary examples, including at least some explicitly enumerated "ECs" (Example Combinations), providing additional description of a variety of example types in accordance with the concepts described herein are provided below. These examples are not meant to be mutually exclusive, exhaustive or restrictive; and the invention is not limited to these example examples but rather encompasses all possible modification and variations within the scope of the issued claims and their equivalents.

EC 1. A method for removing drilling fluid from wet drill cuttings, comprising: at a pressure above atmospheric pressure: using an internal combustion engine, combusting an air-fuel mixture comprising air and a hydrocarbon-based fuel, thereby producing a combustion exhaust at a first temperature; providing the combustion exhaust to the wet drill cuttings to contact and directly heat the wet drill cuttings by convection so that at least some fluid is evaporated therefrom and at least some dry solid drill cuttings remain, the evaporated fluid comprising drilling fluid and water; condensing at least a portion of the evaporated fluid to produce condensed drilling fluid, water and non-condensable inert gas; and separately recovering the condensed drilling fluid, the water and the dry solid drill cuttings.

EC 2. The method of any one of the preceding or subsequent example combinations further comprising: using one or more of a flow control device and a pressure control device, controlling at least one of a flow direction and a pressure of one or more of: the combustion exhaust, the evaporated fluid, the condensed drilling fluid, the water and the non-condensable inert gas.

EC 3. The method of any one of the preceding or subsequent example combinations further comprising: prior to providing the exhaust to the wet drill cuttings, heating the combustion exhaust to a second temperature higher than the first temperature.

EC 4. The method of any one of the preceding or subsequent example combinations, wherein the internal combustion engine is operatively coupled to a generator; and, the method further comprises generating electricity therewith.

EC 5. The method of any one of the preceding or subsequent example combinations, wherein heating the combustion exhaust is performed using an electric line heater operatively connected to the generator and configured to receive at least a portion of the generated electricity.

EC 6. The method of any one of the preceding or subsequent example combinations further comprising: using a heating device, heating the recovered non-condensable inert gas to a third temperature, the third temperature equal or higher than the first temperature; and providing the heated, recovered non-condensable inert gas to the wet drill cuttings to contact and directly heat the wet drill cuttings by convection separately or in combination with the combustion exhaust.

EC 7. The method of any one of the preceding or subsequent example combinations, wherein the heating device is an electric heater operatively connected to a generator that is operatively connected to the internal combustion engine and configured to receive at least a portion of electricity generated by the generator.

EC 8. The method of any one of the preceding or subsequent example combinations further comprising: using a blower device, directing the recovered non-condensable inert gas from the condensing device for receipt by the heating device.

EC 9. The method of any one of the preceding or subsequent example combinations further comprising: providing indirect heat to the wet drill cuttings.

EC 10. The method of any one of the preceding or subsequent example combinations, wherein the internal combustion engine is operatively coupled to a generator configured to generate electricity therewith and a heating device operatively coupled to the generator is used to provide the indirect heat.

EC 11. The method of any one of the preceding or subsequent example combinations further comprising: filtering the evaporated fluid to separate entrained solid drill cuttings therefrom.

EC 12. The method of any one of the preceding or subsequent example combinations, wherein the internal combustion engine is a natural gas fired engine and the hydrocarbon-based fuel is natural gas.

EC 13. The method of any one of the preceding or subsequent example combinations, wherein the air-fuel mixture is a rich air-fuel mixture.

EC 14. The method of any one of the preceding or subsequent example combinations further comprising: sensing at least one of an oxygen level and a carbon monoxide level of the combustion exhaust; and adjusting the amount of fuel or air in the rich-air fuel mixture based on the sensed oxygen level or the sensed carbon monoxide level.

EC 15. The method of any one of the preceding or subsequent example combinations further comprising: agitating the wet drill cuttings while providing the process gas to the wet drill cuttings.

EC 16. The method of any one of the preceding or subsequent example combinations further comprising: cooling the dry solid drill cuttings.

EC 17. A system for removing drilling fluid from wet drill cuttings, comprising: an internal combustion engine having at least one of an air inlet, a fuel inlet and an exhaust outlet, wherein the internal combustion engine is configured to: combust an air-fuel mixture comprising air and a hydrocarbon-based fuel, thereby producing a combustion exhaust at a first temperature; a processor having a processing chamber, the processing chamber having a cuttings inlet through which the wet drill cuttings are received into the processing chamber, an evaporated fluids outlet, a dry drilling solids outlet and at least one combustion exhaust inlet configured to receive the combustion exhaust, directly or indirectly, from the exhaust outlet; wherein the processor is configured to provide the combustion exhaust to the processing chamber to contact and directly heat the wet drill cuttings by convection so that at least some fluid is evaporated therefrom and at least some dry solid drill cuttings remain, the evaporated fluid comprises drilling fluid and water, provide the evaporated fluid to the evaporated fluids outlet for recovery therefrom, and provide dry solid drill cuttings to the dry solids outlet for recovery therefrom; and at least one condensing device having a condenser inlet in fluid communication with the evaporated fluids outlet, a condensed drilling fluids outlet, a non-condensable inert gas outlet and a water outlet; wherein the at least one condensing device is configured to condense at least a portion of the evaporated fluid, received directly or indirectly from the evaporated fluids outlet, to produce condensed drilling fluid, water and non-condensable inert gas, provide the condensed drilling fluid to the condensed drilling fluids outlet for recovery therefrom, provide the non-condensable inert gas to the non-condensable inert gas outlet for recovery therefrom, provide the water to the water outlet for recovery therefrom; and wherein the internal combustion engine, the processor and the at least one condensing device operate at a pressure above atmospheric pressure.

EC 18. The system of any one of the preceding or subsequent example combinations further comprising: one or more of a flow control device and a pressure control device in fluid communication with one or more of the exhaust outlet, the cuttings inlet, the dry drilling solids outlet, the condenser inlet, the condensed drilling fluids outlet, the non-condensable inert gas outlet and the water outlet.

EC 19. The system of any one of the preceding or subsequent example combinations, wherein the flow control device and the pressure control device comprise at least one backflow preventer.

EC 20. The system of any one of the preceding or subsequent example combinations further comprising: a heating device, preferably an electric line heater, configured to receive and heat the combustion exhaust to a second temperature higher than the first temperature, prior to receipt by the processor.

EC 21. The system of any one of the preceding or subsequent example combinations further comprising: a heating device, preferably an electric line heater, configured to receive, directly or indirectly from the at least one condensing device, the recovered non-condensable inert gas and heat the recovered non-condensable inert gas to a third temperature equal to or higher than the first temperature, and provide the heated, recovered non-condensable inert gas to the processor to contact and directly heat the wet drill cuttings by convection separately or in combination with the combustion exhaust.

EC 22. The system of any one of the preceding or subsequent example combinations further comprising: a supplementary heating device configured to provide heat to a thermally conductive surface of the processor, preferably a jacket of the processor, to indirectly heat the wet drill cuttings.

EC 23. The system of any one of the preceding or subsequent example combinations further comprising: a generator operatively connected to the internal combustion engine and configured to generate electricity therewith and to operate at a pressure above atmospheric pressure, and wherein at least one of the heating device and the supplementary heating device are operatively connected to the generator and are configured to receive at least a portion of the generated electricity.

EC 24. The system of any one of the preceding or subsequent example combinations, wherein the system comprises at least one backflow preventer in communication with the exhaust outlet and the combustion exhaust inlet.

EC 25. The system of any one of the preceding or subsequent example combinations further comprising: a blower device configured to receive the non-condensable inert gas from the at least one condensing device and to provide the received non-condensable inert gas to the heating device.

EC 26. The system of any one of the preceding or subsequent example combinations, wherein the at least one condensing device comprises one or more of a heat exchanger and a direct contact condenser.

EC 27. The system of any one of the preceding or subsequent example combinations, wherein the heat exchanger is a liquid-air exchanger.

EC 28. The system of any one of the preceding or subsequent example combinations, wherein the processor is further configured to agitate the wet drill cuttings in the processing chamber while the combustion exhaust is being provided thereto.

EC 29. The system of any one of the preceding or subsequent example combinations further comprising: a solids cooling device configured to receive the dry solid drill cuttings directly or indirectly from the dry solids outlet.

EC 30. The system of any one of the preceding or subsequent example combinations, wherein the processor is operatively connected to the generator and is configured to receive at least a portion of the electricity generated therefrom.

EC 31. The system of any one of the preceding or subsequent example combinations further comprising: a filter in fluid communication with the processor and the at least one condensing device, the filter configured to receive the evaporated fluid, separate entrained solid drill cuttings therefrom and provide the filtered evaporated fluid to the at least one condensing device via the condenser inlet.

EC 32. The system of any one of the preceding or subsequent example combinations further comprising: at least one of an oxygen sensing device and a carbon monoxide sensing device configured to sense at least one of an oxygen level and a carbon monoxide level of the combustion exhaust.

EC 33. The system of any one of the preceding or subsequent example combinations further comprising: a controller operatively connected to the at least one oxygen sensing device, the carbon monoxide device and a hydrocarbon-based fuel source of the internal combustion engine, the controller configured to adjust at least one of the amount of hydrocarbon-based fuel and the air in the air-fuel mixture based on at least one of the sensed oxygen level and the sensed carbon monoxide level.

EC 34. A processor for removing drilling fluid from wet drilling cuttings, comprising: a processing chamber, the processing chamber having a cuttings inlet through which the wet drill cuttings are received into the processing chamber, an evaporated drilling fluids outlet, a dry drilling solids outlet, a process gas inlet configured to receive process gas, a fixed stage comprising a fixed bed in fluid communication with the process gas inlet and configured to receive the process gas therefrom, an agitator stage upstream of and in fluid communication with the fixed bed and configured to receive the process gas therefrom, the agitator stage operatively connected to the cuttings inlet and having a mixing device configured to agitate the wet drill cuttings received therefrom. The processor is configured to: provide the process gas to the fixed bed and the agitator stage, thereby heating the fixed bed and agitator stage so as to heat and agitate the wet drill cuttings so that at least a portion of drilling fluid is evaporated therefrom and at least some dry solid drill cuttings remain, provide evaporated drilling fluid to the evaporated drilling fluids outlet for recovery therefrom, and provide dry solid drill cuttings to the dry solids outlet for recovery therefrom; and wherein the processor operates at a pressure above atmospheric pressure.

EC 35. A system for removing drilling fluid from wet drill cuttings, comprising: an internal combustion engine having at least one of an air inlet, a fuel inlet and an exhaust outlet, wherein the internal combustion engine is configured to: combust an air-fuel mixture comprising air and a hydrocarbon-based fuel, thereby producing a combustion exhaust at a first temperature; a processor having a processing chamber, the processing chamber having a cuttings inlet through which the wet drill cuttings are received into the processing chamber, an evaporated fluids outlet, a dry drilling solids outlet and at least one combustion exhaust inlet configured to receive the combustion exhaust, directly or indirectly, from the exhaust outlet, a fixed stage comprising a fixed bed in fluid communication with the at least one combustion exhaust inlet and configured to receive the combustion exhaust therefrom, an agitator stage upstream of and in fluid communication with the fixed bed and configured to receive the combustion exhaust therefrom, the agitator stage operatively connected to the cuttings inlet and having a mixing device configured to agitate the wet drill cuttings received therefrom; wherein the processor is configured to provide the combustion exhaust to the processing chamber to contact and directly heat the wet drill cuttings by convection so that at least some fluid is evaporated therefrom and at least some dry solid drill cuttings remain, the evaporated fluid comprises drilling fluid and water, provide the evaporated fluid to the evaporated fluids outlet for recovery therefrom, and provide dry solid drill cuttings to the dry solids outlet for recovery therefrom; and at least one condensing device having a condenser inlet in fluid communication with the evaporated fluids outlet, a condensed drilling fluids outlet, a non-condensable inert gas outlet and a water outlet; wherein the at least one condensing device is configured to condense at least a portion of the evaporated fluid, received directly or indirectly from the evaporated fluids outlet, to produce condensed drilling fluid, water and non-condensable inert gas, provide the condensed drilling fluid to the condensed drilling fluids outlet for recovery therefrom, provide the non-condensable inert gas to the non-condensable inert gas outlet for recovery therefrom, provide the water to the water outlet for recovery therefrom; and wherein in providing the combustion exhaust to the processing chamber to contact and directly heat the wet drill cuttings by convection comprises providing the combustion exhaust to the agitator stage via the fixed bed and agitating the wet drill cuttings by the mixing device; and wherein the internal combustion engine, the processor and the at least one condensing device operate at a pressure above atmospheric pressure.

EC 36. The system of any one of the preceding or subsequent example combinations, wherein the mixing device is a mechanical mixing device.

EC 37. A system for removing drilling fluid from wet drill cuttings, comprising: a purge system downstream the fixed stage and configured to compel at least a portion of the dry solid drill cuttings for receipt by the dry solids outlet.

EC 38. The system of any one of the preceding example combinations, wherein the fixed stage comprises a heat distribution system configured to distribute the received combustion exhaust across at least one heat distribution plane of the agitator stage.

Persons skilled in the art will appreciate that there are yet more alternative implementations and modifications possible, and that the above examples are only illustrations of one or more implementations. The scope, therefore, is only to be limited by the claims appended hereto.

Illustrative Example

The following example is provided for a better understanding as to how the described systems and methods may be carried out. However, this example should not be construed as limiting the scope of the claims appended hereto.

In this illustrative example, the characteristics of internal combustion engine 102 required to dry wet drill cuttings 124 provided at a flow rate of about 5 cubic meters/hr, with a density of about 1,750 kg/cubic meter, and comprising about 80% solids by weight and about 20% fluids by weight are determined. According to this example, the fluid fraction of the wet drill cuttings 124 comprises about 90% oil by weight and about 10% water by weight. This is equivalent to about 15,400 lb/hr solids, about 3,465 lb/hr oil and about 385 lb/hr water.

The heat capacity of the components of the wet drill cuttings 124 are about 0.25 Btu/lb/° F. for the solids, about 0.4 Btu/lb/° F. for the oil and about 1 Btu/lb/° F. for the water. A temperature of about 300° C. (equivalent to about 572° F.) is used to reduce the amount of oil in the wet drill cuttings 124 from about 10% to about 1% by weight. Reducing the amount of oil in wet drill cuttings 124 to about 1% by weight is usually sufficient to enable the hauling of the dry drilling solids 130 without adding any sawdust to reduce the amount of free fluid.

The net heat requirement to dry the wet drill cuttings 124 is estimated to be about 366,000 Btu/metric tonne, assuming an initial temperature of about 72° F., for a total temperature rise of 500° F. Given the wet drill cuttings 124 have a density of about 1,750 kg/cubic meters, about 3,400,000 Btu/hr, of net heat is required to dry the wet drill cuttings 124 at the target flow rate of about 5 cubic meters/hr is calculated as follows:

Net heat requirement:

| Solids | 15,400 lb/hr*0.25 Btu/lb/° F.* 500° F. | = 1,925,000 Btu/hr |
|---|---|---|
| Oil | 3,465 lb/hr*0.4 Btu/lb/° F.* 500° F. | = 693,000 Btu/hr |
| Water | 385 lb/hr*(1 Btu/lb/° F.* 500° F. + 1000 Btu/lb.) | = 577,500 Btu/hr |
| Total: | | = 3,195,500 Btu/hr | a. Supply heat target temperature is about 720° C., exhaust temperature of the engine
b. Wish to supplement with electric recycle heating to about 720° C. from about 100° C.
c. Estimate engine efficiency of about 38% for shaft power, and about 30% energy in exhaust
d. Gross engine heat input is 3.6 GJ/MW/0.38=9.47 GJ/MW or approximately 9,000,000 Btu/MW
e. Ratio of exhaust energy transferred to cuttings based on temperature drop from about 720° C. to about 300° C. is 420/(720+273)=0.423, or 0.3*9,000,000 Btu/MW*0.423=1,142,100 Btu/MW net heat to cuttings
f. Gross electric equivalent heat based on shaft power is 0.38*9,000,000 Btu/MW=3,420,000 Btu/MW
g. The ratio of net electric heat transfer to cuttings based on about 80% gas heating efficiency, about 100° C. recycle gas heated to about 720° C. and transferring about 420° C. to cuttings, is 0.8*420/620=0.54
h. Equivalent electric heat transfer is thus 0.54*3,420,000 Btu/MW=1,846,800 Btu/MW
i. Total heat per MW, exhaust heat plus electrical heat, is 1,142,100 Btu/MW+1,846,800 Btu/MW=2,988,900 Btu/MW
j. Required engine size then is logically about 1 MW*3,200,000 Btu/hr/3,000,000 Btu/hr or about 1.1 MW Those familiar with the art will also understand that using the electrical heat to heat the recycle gas to a temperature of approximately 950° C. would enable heating with a 1 MW engine. Those familiar with the art would also recognize that utilizing the electrical heat to increase the temperature of the engine exhaust gas could add more efficiency at the expense of higher temperature materials exposed to the much higher gas temperatures, potentially over about 1500° C.

Therefore, an internal combustion engine 102 with a power output of at least about 1 MW would provide sufficient heat to dry the wet drill cuttings 124 and provide the power required for the additional small electrical loads.

INTERPRETATION

It will also be understood that for the purposes of this application, "at least one of X, Y, and Z" or "one or more of X, Y, and Z" language can be construed as X only, Y only, Z only, or any combination of two or more items X, Y, and Z (e.g., XYZ, XYY, YZ, ZZ).

In the present application, components may be described as "configured to" or "enabled to" perform one or more functions. Generally, it is understood that a component that is configured to or enabled to perform a function is configured to or enabled to perform the function, or is suitable for performing the function, or is adapted to perform the function, or is operable to perform the function, or is otherwise capable of performing the function.

Additionally, components in the present application may be described as "operatively connected to", "operatively coupled to", and the like, to other components. It is understood that such components are connected or coupled to each other in a manner to perform a certain function. It is also understood that "connections", "coupling" and the like, as recited in the present application include direct and indirect connections between components.

References in the application to "one embodiment", "an embodiment", "an implementation", "a variant", etc., indicate that the embodiment, implementation or variant described may include a particular aspect, feature, structure, or characteristic, but not every embodiment, implementation or variant necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such module, aspect, feature, structure, or characteristic with other embodiments, whether or not explicitly described. In other words, any module, element or feature may be combined with any other element or feature in different embodiments, unless there is an obvious or inherent incompatibility, or it is specifically excluded.

It is further noted that the claims may be drafted to exclude any optional element. As such, this statement is intended to serve as antecedent basis for the use of exclusive terminology, such as "solely", "only", and the like, in connection with the recitation of claim elements or use of a "negative" limitation. The terms "preferably", "preferred", "prefer", "optionally", "may", and similar terms are used to indicate that an item, condition or step being referred to is an optional (not required) feature of the invention.

The singular forms "a", "an", and "the" include the plural reference unless the context clearly dictates otherwise. The term "and/or" means any one of the items, any combination of the items, or all of the items with which this term is associated. The phrase "one or more" is readily understood by one of skill in the art, particularly when read in context of its usage.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio.

What is claimed is:

1. A method for removing drilling fluid from wet drill cuttings, comprising:
at a pressure above atmospheric pressure:
using an internal combustion engine,
combusting an air-fuel mixture comprising air and a hydrocarbon-based fuel, thereby producing a combustion exhaust at a first temperature;
providing the combustion exhaust to the wet drill cuttings to contact and directly heat the wet drill cuttings by convection so that at least some fluid is evaporated therefrom and at least some dry solid drill cuttings remain, the evaporated fluid comprising drilling fluid and water;
agitating the wet drill cuttings while providing the combustion exhaust to the wet drill cuttings,
condensing at least a portion of the evaporated fluid to produce condensed drilling fluid, water and non-condensable inert gas; and
separately recovering the condensed drilling fluid, the water and the dry solid drill cuttings,
wherein the step of providing the combustion exhaust to the wet drill cuttings comprises:
providing the combustion exhaust to a fixed bed of a fixed stage configured to receive the combustion exhaust, and
providing the combustion exhaust to an agitator stage upstream of and in fluid communication with the fixed bed and configured to receive the combustion exhaust therefrom, the agitator stage having a mechanical mixing device configured to agitate the wet drill cuttings during the agitating.

2. The method of claim 1, further comprising:
prior to providing the exhaust to the wet drill cuttings, heating the combustion exhaust to a second temperature higher than the first temperature.

3. The method of claim 1, wherein:
the internal combustion engine is operatively coupled to a generator; and
the method further comprises generating electricity therewith.

4. The method of claim 3, wherein heating the combustion exhaust is performed using an electric line heater operatively connected to the generator and configured to receive at least a portion of the generated electricity.

5. The method of claim 1, further comprising:
recovering non-condensable inert gas;
using a heating device, heating the-recovered non-condensable inert gas to a third temperature, the third temperature equal or higher than the first temperature; and
providing the heated, recovered non-condensable inert gas to the wet drill cuttings to contact and directly heat the wet drill cuttings by convection separately or in combination with the combustion exhaust.

6. The method of claim 5, wherein the heating device is an electric heater operatively connected to a generator that is operatively connected to the internal combustion engine and configured to receive at least a portion of electricity generated by the generator.

7. The method of claim 5, further comprising:
using a blower device, directing the recovered non-condensable inert gas from the condensing device for receipt by the heating device.

8. The method of claim 1, further comprising:
providing indirect heat to the wet drill cuttings.

9. The method of claim 8, wherein the internal combustion engine is operatively coupled to a generator configured to generate electricity therewith and a heating device operatively coupled to the generator is used to provide the indirect heat.

10. A system for removing drilling fluid from wet drill cuttings, comprising:
an internal combustion engine having at least one of an air inlet, a fuel inlet and an exhaust outlet, wherein the internal combustion engine is configured to combust an air-fuel mixture comprising air and a hydrocarbon-based fuel, thereby producing a combustion exhaust at a first temperature;
a processor having a processing chamber, the processing chamber having a cuttings inlet through which the wet drill cuttings are received into the processing chamber, an evaporated drilling fluids outlet, a dry drilling solids outlet, a combustion exhaust inlet configured to receive combustion exhaust, a fixed stage comprising a fixed bed in fluid communication with the combustion exhaust inlet and configured to receive the process gas therefrom, an agitator stage upstream of and in fluid communication with the fixed bed and configured to receive the combustion exhaust therefrom, the agitator stage operatively connected to the cuttings inlet and having a mixing device configured to agitate the wet drill cuttings received therefrom;
wherein the processor is configured to:
provide the combustion exhaust to the fixed bed and the agitator stage, thereby heating the fixed bed and agitator stage so as to heat and agitate the wet drill cuttings so that at least a portion of drilling fluid is evaporated therefrom and at least some dry solid drill cuttings remain,
provide the evaporated fluid to the evaporated fluids outlet for recovery therefrom, and
provide dry solid drill cuttings to the dry solids outlet for recovery therefrom; and
at least one condensing device having a condenser inlet in fluid communication with the evaporated fluids outlet, a condensed drilling fluids outlet, a non-condensable inert gas outlet and a water outlet;
wherein the at least one condensing device is configured to:
condense at least a portion of the evaporated fluid, received directly or indirectly from the evaporated fluids outlet, to produce condensed drilling fluid, water and non-condensable inert gas,
provide the condensed drilling fluid to the condensed drilling fluids outlet for recovery therefrom,
provide the non-condensable inert gas to the non-condensable inert gas outlet for recovery therefrom, and
provide the water to the water outlet for recovery therefrom;
wherein the internal combustion engine, the processor and the at least one condensing device operate at a pressure above atmospheric pressure; and
wherein in providing the combustion exhaust to the fixed bed and the agitator stage the combustion exhaust is provided to the processing chamber to contact and directly heat the wet drill cuttings by convection.

11. The system of claim 10, further comprising:
a heating device configured to:
  receive, directly or indirectly from the at least one condensing device, the recovered non-condensable inert gas and heat the recovered non-condensable inert gas to a third temperature equal to or higher than the first temperature, and
  provide the heated, recovered non-condensable inert gas to the processor to contact and directly heat the wet drill cuttings by convection separately or in combination with the combustion exhaust.

12. The system of claim 10, further comprising:
a supplementary heating device configured to provide heat to a thermally conductive surface of the processor to indirectly heat the wet drill cuttings.

13. The system of claim 12, further comprising:
a generator operatively connected to the internal combustion engine and configured to generate electricity therewith and to operate at a pressure above atmospheric pressure,
wherein:
  at least one of the heating device and the supplementary heating device are operatively connected to the generator and are configured to receive at least a portion of the generated electricity, and
  the processor is operatively connected to the generator and is configured to receive at least a portion of the electricity generated therefrom.

14. The system of claim 11, further comprising:
a blower device configured to receive the non-condensable inert gas from the at least one condensing device and to provide the received non-condensable inert gas to the heating device.

15. A processor for removing drilling fluid from wet drill cuttings, the processor comprising:
a processing chamber, the processing chamber having a cuttings inlet through which the wet drill cuttings are received into the processing chamber, an evaporated drilling fluids outlet, a dry drilling solids outlet, a process gas inlet configured to receive process gas, a fixed stage comprising a fixed bed in fluid communication with the process gas inlet and configured to receive the process gas therefrom, an agitator stage upstream of and in fluid communication with the fixed bed and configured to receive the process gas therefrom, the agitator stage operatively connected to the cuttings inlet and having a mixing device configured to agitate the wet drill cuttings received therefrom,
wherein the processor is configured to:
  provide the process gas to the fixed bed and the agitator stage, thereby heating the fixed bed and agitator stage so as to heat and agitate the wet drill cuttings so that at least a portion of drilling fluid is evaporated therefrom and at least some dry solid drill cuttings remain,
  provide evaporated drilling fluid to the evaporated drilling fluids outlet for recovery therefrom, and
  provide dry solid drill cuttings to the dry solids outlet for recovery therefrom;
wherein the processor operates at a pressure above atmospheric pressure; and
wherein in providing the process gas to the fixed bed and the agitator stage the process gas is provided to the processing chamber to contact and directly heat the wet drill cuttings by convection.

16. A system for removing drilling fluid from wet drill cuttings, comprising:
an internal combustion engine having at least one of an air inlet, a fuel inlet and an exhaust outlet, wherein the internal combustion engine is configured to combust an air-fuel mixture comprising air and a hydrocarbon-based fuel, thereby producing a combustion exhaust at a first temperature;
a processor having a processing chamber, the processing chamber having a cuttings inlet through which the wet drill cuttings are received into the processing chamber, an evaporated fluids outlet, a dry drilling solids outlet and at least one combustion exhaust inlet configured to receive the combustion exhaust, directly or indirectly, from the exhaust outlet, a fixed stage comprising a fixed bed in fluid communication with the at least one combustion exhaust inlet and configured to receive the combustion exhaust therefrom, an agitator stage upstream of and in fluid communication with the fixed bed and configured to receive the combustion exhaust therefrom, the agitator stage operatively connected to the cuttings inlet and having a mixing device configured to agitate the wet drill cuttings received therefrom;
wherein the processor is configured to:
  provide the combustion exhaust to the processing chamber to contact and directly heat the wet drill cuttings by convection so that at least some fluid is evaporated therefrom and at least some dry solid drill cuttings remain, the evaporated fluid comprises drilling fluid and water,
  provide the evaporated fluid to the evaporated fluids outlet for recovery therefrom, and
  provide dry solid drill cuttings to the dry solids outlet for recovery therefrom; and
at least one condensing device having a condenser inlet in fluid communication with the evaporated fluids outlet, a condensed drilling fluids outlet, a non-condensable inert gas outlet and a water outlet;
wherein the at least one condensing device is configured to:
  condense at least a portion of the evaporated fluid, received directly or indirectly from the evaporated fluids outlet, to produce condensed drilling fluid, water and non-condensable inert gas,
  provide the condensed drilling fluid to the condensed drilling fluids outlet for recovery therefrom,
  provide the non-condensable inert gas to the non-condensable inert gas outlet for recovery therefrom, and
  provide the water to the water outlet for recovery therefrom; and
wherein in providing the combustion exhaust to the processing chamber to contact and directly heat the wet drill cuttings by convection comprises providing the combustion exhaust to the agitator stage via the fixed bed and agitating the wet drill cuttings by the mixing device; and
wherein the internal combustion engine, the processor and the at least one condensing device operate at a pressure above atmospheric pressure.

17. The system of claim 16, wherein the mixing device is a mechanical mixing device.

18. The system of claim 16, further comprising a purge system downstream the fixed stage and configured to compel at least a portion of the dry solid drill cuttings for receipt by the dry solids outlet.

19. The system of claim 16, wherein the fixed stage comprises a heat distribution system configured to distribute the received combustion exhaust across at least one heat distribution plane of the agitator stage.

* * * * *

UNITED STATES PATENT AND TRADEMARK OFFICE
CERTIFICATE OF CORRECTION

| | | |
|---|---|---|
| PATENT NO. | : 11,970,917 B2 | Page 1 of 1 |
| APPLICATION NO. | : 17/755413 | |
| DATED | : April 30, 2024 | |
| INVENTOR(S) | : Barry McIntyre | |

It is certified that error appears in the above-identified patent and that said Letters Patent is hereby corrected as shown below:

On the Title Page

Item (73) Assignee, Please change "ELAVO ENERGY SOLUTIONS LTD., Calgary (CA)" to --ELAVO CLEANTECH LTD., Calgary (CA)--.

Signed and Sealed this
Thirty-first Day of December, 2024

Derrick Brent
*Acting Director of the United States Patent and Trademark Office*